United States Patent
Schaeffer et al.

(10) Patent No.: US 9,089,813 B2
(45) Date of Patent: Jul. 28, 2015

(54) THERMAL CONDITIONING FOR AIR SEPARATION MODULES

(75) Inventors: Jeremy A. Schaeffer, Walcott, IA (US); David W. Chaudoir, Rockford, IL (US); Michael G. Schneider, Rockford, IL (US)

(73) Assignee: Carleton Life Support Systems, Inc., Davenport, IA (US)

( * ) Notice: Subject to any disclaimer, the term of this patent is extended or adjusted under 35 U.S.C. 154(b) by 676 days.

(21) Appl. No.: 13/811,531

(22) PCT Filed: Jul. 8, 2010

(86) PCT No.: PCT/US2010/041347
§ 371 (c)(1),
(2), (4) Date: Sep. 30, 2013

(87) PCT Pub. No.: WO2011/005946
PCT Pub. Date: Jan. 13, 2011

(65) Prior Publication Data
US 2014/0013951 A1    Jan. 16, 2014

Related U.S. Application Data

(60) Provisional application No. 61/224,365, filed on Jul. 9, 2009.

(51) Int. Cl.
*B01D 53/22* (2006.01)
*B64D 37/32* (2006.01)

(52) U.S. Cl.
CPC ............ *B01D 53/229* (2013.01); *B01D 53/227* (2013.01); *B01D 2256/10* (2013.01); *B01D 2256/12* (2013.01); *B64D 37/32* (2013.01)

(58) Field of Classification Search
CPC .......... B01D 2256/10; B01D 2256/12; B01D 53/227; B01D 53/229; B64D 37/32
See application file for complete search history.

(56) References Cited

U.S. PATENT DOCUMENTS

| | | | |
|---|---|---|---|
| RE31,281 E * | 6/1983 | Swenson et al. | 62/160 |
| 6,318,077 B1 * | 11/2001 | Claypole et al. | 60/303 |
| 7,374,601 B2 * | 5/2008 | Bonchonsky et al. | 95/138 |
| 2008/0060523 A1 * | 3/2008 | Tom et al. | 96/109 |

* cited by examiner

*Primary Examiner* — Christopher P Jones
(74) *Attorney, Agent, or Firm* — Woods Oviatt Gilman LLP; Katherine H. McGuire, Esq.

(57) ABSTRACT

Thermal conditioning for an area surrounding one or more air separation canisters includes directing the exhaust gas of the thermal conditioning unit to the area surrounding the canisters. The area may be defined by a housing in which the canisters are positioned.

9 Claims, 3 Drawing Sheets

THERMAL CONDITIONING FOR AIR SEPARATION MODULES

RELATED APPLICATION

This application claims priority to U.S. Provisional Patent Application Ser. No. 61/224,365 filed on Jul. 9, 2009.

BACKGROUND OF THE INVENTION

The present invention relates to air separation systems which function to separate nitrogen which may then be used to inert an open space such as a fuel tank or cargo hold of an airplane.

Hollow fiber membranes, which constitute the air separation media for air separation systems, are housed in Air Separation Canisters. These canisters are used in air separation systems to generate nitrogen enriched air (NEA) and oxygen enriched air (OEA). The performance of these canisters, in terms of NEA generation rate and purity, is sensitive to the operating pressure and temperature of the inlet air flow. In addition, the performance is affected by the thermal conditions of the surrounding environment, to the extent that performance degrades significantly as the surrounding temperature falls below an effective operating range of temperatures. A separate thermal conditioning system could be added to canisters to heat them with electric resistance heaters or hot bleed air. However, the electric power system capacity is limited in applications such as aircraft fuel tank inerting systems. In addition, the bleed air supply system capacity is limited in aircraft applications, and does not have excess flow to be utilized for additional thermal conditioning applications.

There therefore remains a need for an efficient method and apparatus for thermally conditioning and controlling the temperature of the air space in which the air separation canisters are located to optimize the performance thereof.

SUMMARY OF THE INVENTION

The present invention addresses the above need by providing a thermal conditioning method and apparatus for controlling the temperature of the air space surrounding one or more air separation canisters. More particularly, the present invention provides an apparatus and system in which waste heat from a system, such as the thermal conditioning unit of a fuel tank inerting system, is used to provide thermal conditioning to one or more air separation canisters. In one embodiment, the invention comprises an apparatus for controlling the temperature of an air space surrounding one or more air separation canisters, the apparatus comprising:
a) one or more air separation canisters; and
b) a thermal conditioning including:
  i) a hot air inlet;
  ii) a cool air inlet;
  iii) a first outlet air line connected to said one or more air separation canisters, said thermal conditioning unit operable to deliver conditioned air to be separated through said first outlet air line to said one or more air separation canisters; and
  iv) a second outlet air line leading to the area in which said one or more air separation canisters are located, said thermal conditioning unit operable to deliver heated waste air through said second outlet air line to said area.

The invention may further comprise a housing surrounding the one or more canisters, the housing defining the area to which said heated waste air is delivered. The housing may be thermally insulated.

The invention may further comprise a valve operable to control the amount of heated gas delivered to the area or housing.

The second outlet air line may include a branch line vented to ambient and the valve may be located in the branch line, in the second outlet air line between said branch line and the area or housing, or at the juncture of the branch and second air outlet line.

The invention may further comprise a temperature sensor and controller operable to control the valve in response to the temperature sensed in the area or housing.

The cooling air inlet may include a branch line which may connect to the second outlet air line.

The invention may further comprise a valve in the branch line and operable to control the amount of cooling air delivered through the branch line to the second air outlet line and thereby optimize the temperature of the heated waste air delivered through the second outlet air line to the area or housing.

The invention may further comprise a temperature sensor and controller operable to control the valve in response to the temperature sensed in the first outlet air line.

DETAILED DESCRIPTION OF A PREFERRED EMBODIMENT

Figure 1:
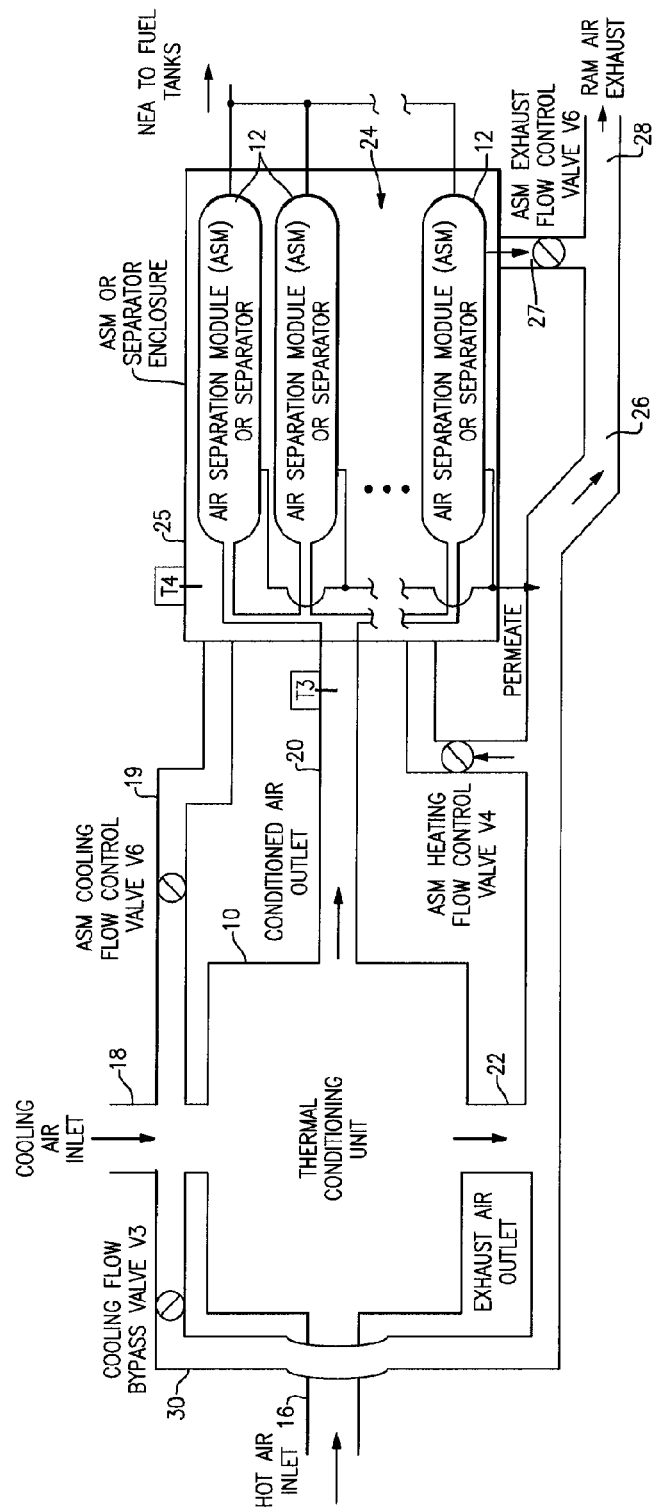
FIG. 1 is a schematic of one embodiment of the invention.
Figure 2:
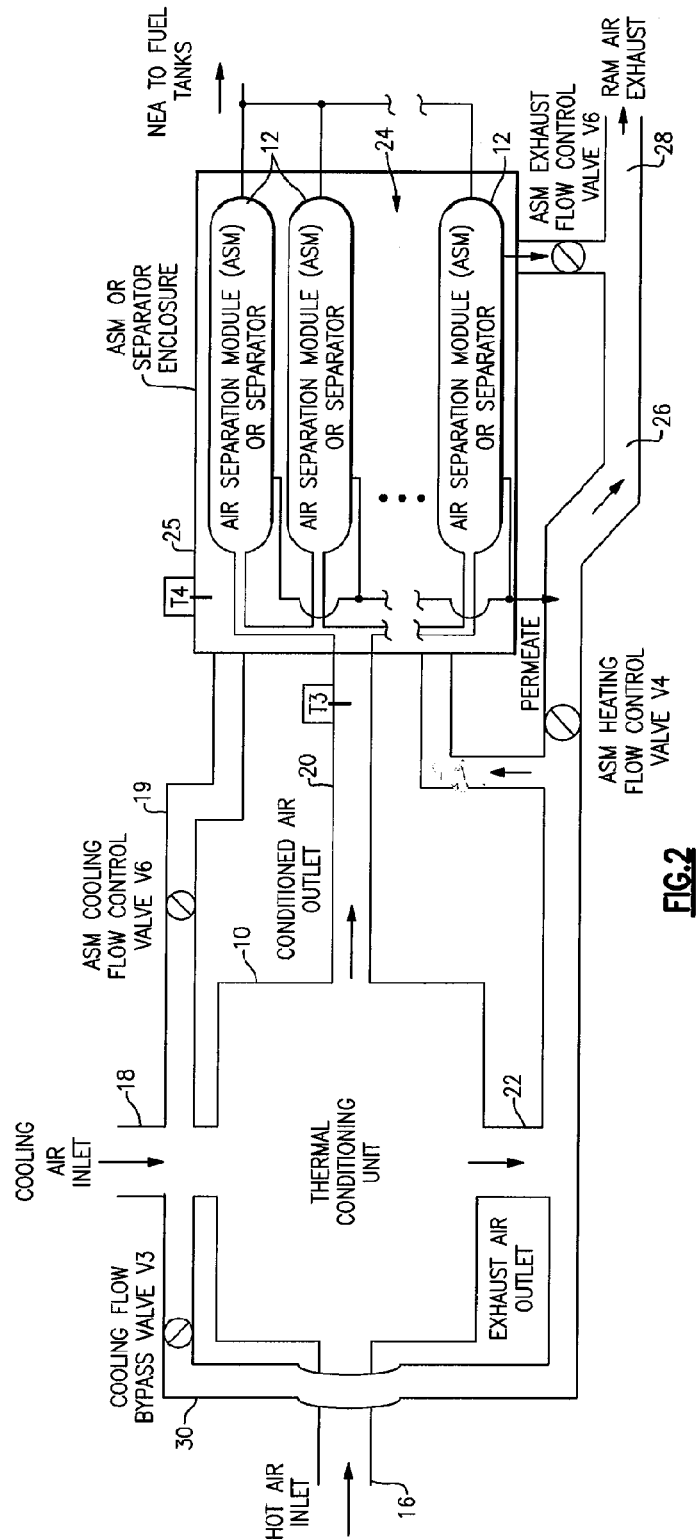
FIG. 2 is a schematic of another embodiment of the invention.
Figure 3:
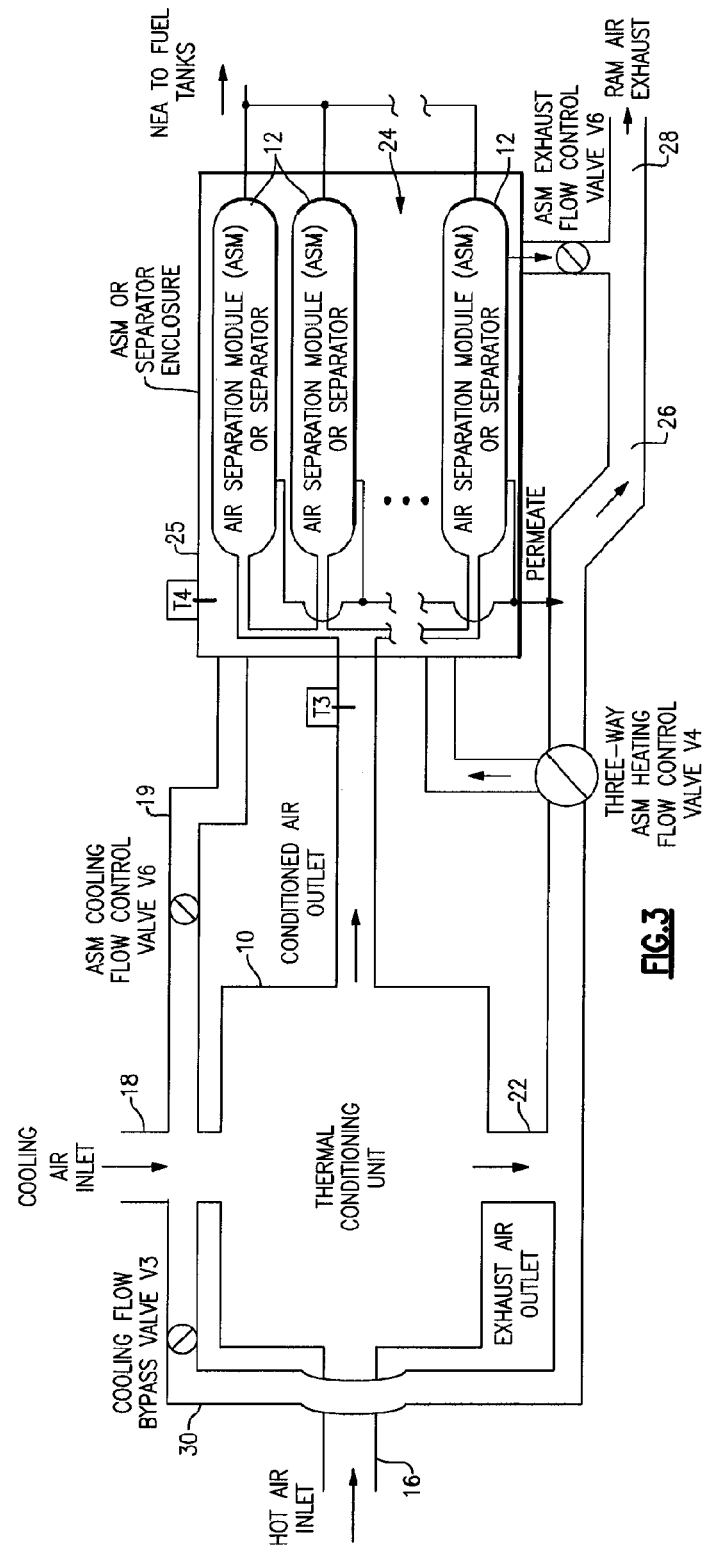
FIG. 3 is a schematic of yet another embodiment of the invention.

Referring now to the drawings, alternate embodiments of the invention are shown in FIGS. 1-3. Common to each embodiment is a thermal conditioning unit 10 and one or more air separation canisters 12 which operate to produce a source of nitrogen enriched air "NEA" as indicated at arrow 14. Thermal conditioning unit 10 includes a hot air inlet 16 (e.g., from engine bleed air or other available hot/pressurized air source), a cool air inlet 18 (e.g., from ambient or other available cool air source), and a first outlet air line 20 connected to the one or more air separation canisters 12 with thermal conditioning unit 10 operable to deliver conditioned air to be separated through first outlet air line 20 to the one or more air separation canisters 12. Thermal conditioning unit 10 further includes a second outlet air line 22 from which heated waste gas exits thermal conditioning unit 10. Second outlet air line 22 leads to the area 24 in which the one or more air separation canisters 12 are located. Thermal conditioning unit is thus operable to deliver heated waste air through second outlet air line 22 to area 24. An optional housing 25, which may be thermally insulated, may be used to hold the one or more canisters 12 and thereby define area 24.

A flow control valve, V4, which modulates the flow to area 24, may be provided in line 22 as seen in FIG. 1. In the embodiment of FIG. 2, valve V4 is located in a branch line 26 which is vented as ram air exhaust as indicated at arrow 28. In the embodiment of FIG. 3, valve V4 is located at the juncture of line 22 and branch line 26 and operates as a three-way valve. It is also noted that a vent line 27 may be provided connecting housing area 24 to line 28 with an optional valve V5 positioned therein which may be closed or partially closed should this provide useful in further regulating the temperature of area 24.

A point of regulation (POR) temperature sensor, T4, may be positioned in area 24 to operate valve V4 to regulate the amount of heated waste gas entering area 24 and thereby maintain area 24 at a predetermined temperature or within a range of temperatures. Greater than about 30 degrees F. and less than about 220 degrees F. Thus, if sensor T4 senses a temperature of area 24 that is lower than the optimal temperature at which canisters 12 should operate, a signal is sent to valve V4 to open and allow heated gas to enter area 24 and thereby raise the temperature of the air in area 24 which in turn raises the temperature of canisters 12. Conversely, if the sensed temperature in area 24 is higher than the optimal operating temperature of canister 12, a signal is sent to close valve V4 to slow or prevent heated gas from entering area 24. Should further cooling of area 24 be necessary, a branch line 19 off of cool air inlet 18 may connect to area 24 with a valve V6 positioned therein to open and allow cool air to enter area 24 as needed.

To further regulate the temperature of the gas entering area 24, a branch line 30 may be provided extending from cool air inlet 18 and leading and connecting to second outlet air line 22a. A valve V3 may be provided in branch line 30 in order to optimize the temperature of the cooling gas entering area 24. In conjunction with this, a temperature sensor T3 may be provided in outlet air line 20 and used to control valve V3 to help regulate the temperature of the air entering canisters 12 through line 20. Thus, if sensor T3 senses a temperature which is higher than the optimal temperature range of the air separation canister working gas (e.g., about 170-190 degrees F.) being delivered to canisters 12 through line 20, sensor T3 will send a signal to close or partly close valve V3. Conversely, if sensor T3 senses a temperature which is lower than the optimal temperature of the working gas being delivered, sensor T3 will send a signal to open or partly open valve V3 to divert cool air from line 18. It is also understood that valve V3 may be positioned in line 18 or at the juncture of line 18 and line 30. It will thus be appreciated that valve V3 may be used not only to help regulate the temperature of the working gas in line 20 via signals from temperature sensor T3, but also to help regulate the temperature of the gas in line 22 which reaches valve V4 which in turn controls delivery of the gas into area 24.

What is claimed is:

1. Apparatus for controlling the temperature of an air space surrounding one or more air separation canisters, said apparatus comprising:

a. one or more air separation canisters; and
    b. a thermal conditioning unit including:
        i. a hot air inlet;
        ii. a cool air inlet;
        iii. a first outlet air line connected to said one or more air separation canisters, said thermal conditioning unit operable to deliver conditioned air to be separated through said first outlet air line to said one or more air separation canisters;
        iv. a second outlet air line leading to the area in which said one or more air separation canisters are located, said thermal conditioning unit operable to deliver heated waste air through said second outlet air line to said area; and
        v. a first branch line connected to and between said cool air inlet and said second outlet air line leading to said area;
        vi. a first valve in said first branch line, said first valve operable to control the amount of cooling air delivered through said first branch line to said second air outlet line and thereby optimize the temperature of the heated waste air delivered through said second outlet air line to said area.

2. The apparatus of claim 1, and further comprising a housing surrounding said one or more canisters, said housing defining said area to which said heated waste air is delivered.

3. The apparatus of claim 2 wherein said housing is thermally insulated.

4. The apparatus of claim 3, wherein said second outlet air line includes a second branch line vented to ambient.

5. The apparatus of claim 4 wherein a second valve is located in said second branch line.

6. The apparatus of claim 5 wherein said second valve is located in said second outlet air line between said second branch line and said housing.

7. The apparatus of claim 5 wherein said second valve is located at the juncture of said second outlet air line and said second branch line.

8. The apparatus of claim 1 and further comprising a temperature sensor and controller operable to control said first valve in response to the temperature sensed in said housing.

9. The apparatus of claim 5 and further comprising a temperature sensor and controller operable to control said second valve in response to the temperature sensed in said first outlet air line.

\* \* \* \* \*